No. 671,122. Patented Apr. 2, 1901.
J. F. WHITE.
LOADING OR UNLOADING APPARATUS.
(Application filed Aug. 31, 1900.)
(No Model.) 3 Sheets—Sheet 1.

J. F. White,
Inventor

Witnesses By _____ Attorney

THE NORRIS PETERS CO., PHOTO-LITHO., WASHINGTON, D. C.

No. 671,122. Patented Apr. 2, 1901.
J. F. WHITE.
LOADING OR UNLOADING APPARATUS.
(Application filed Aug. 31, 1900.)
(No Model.) 3 Sheets—Sheet 2.
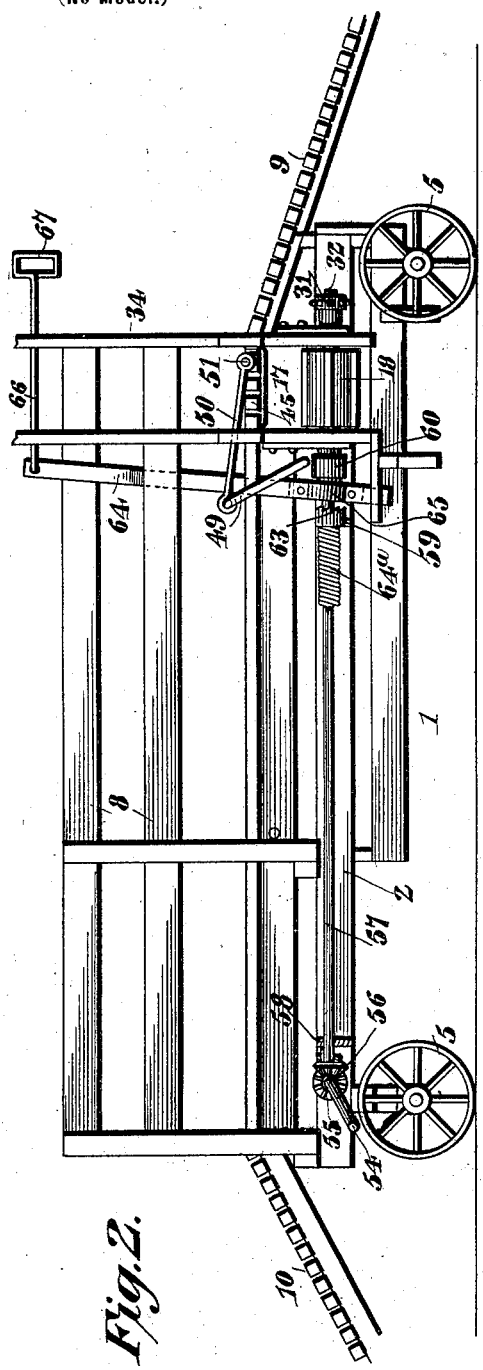
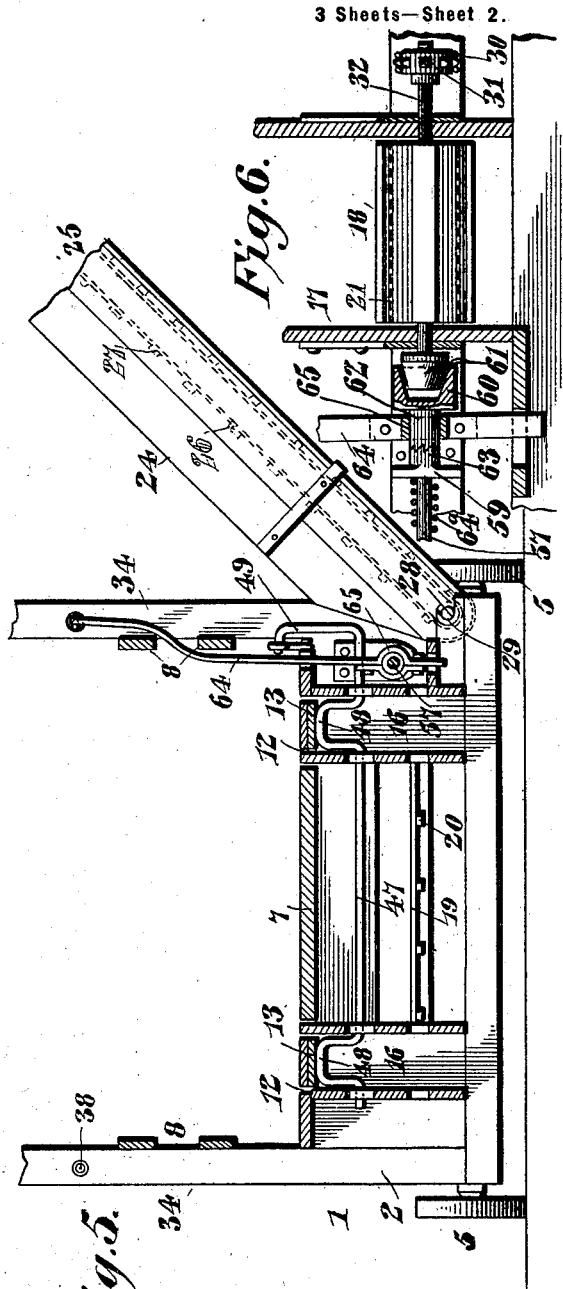
J. F. White,
Inventor
Witnesses

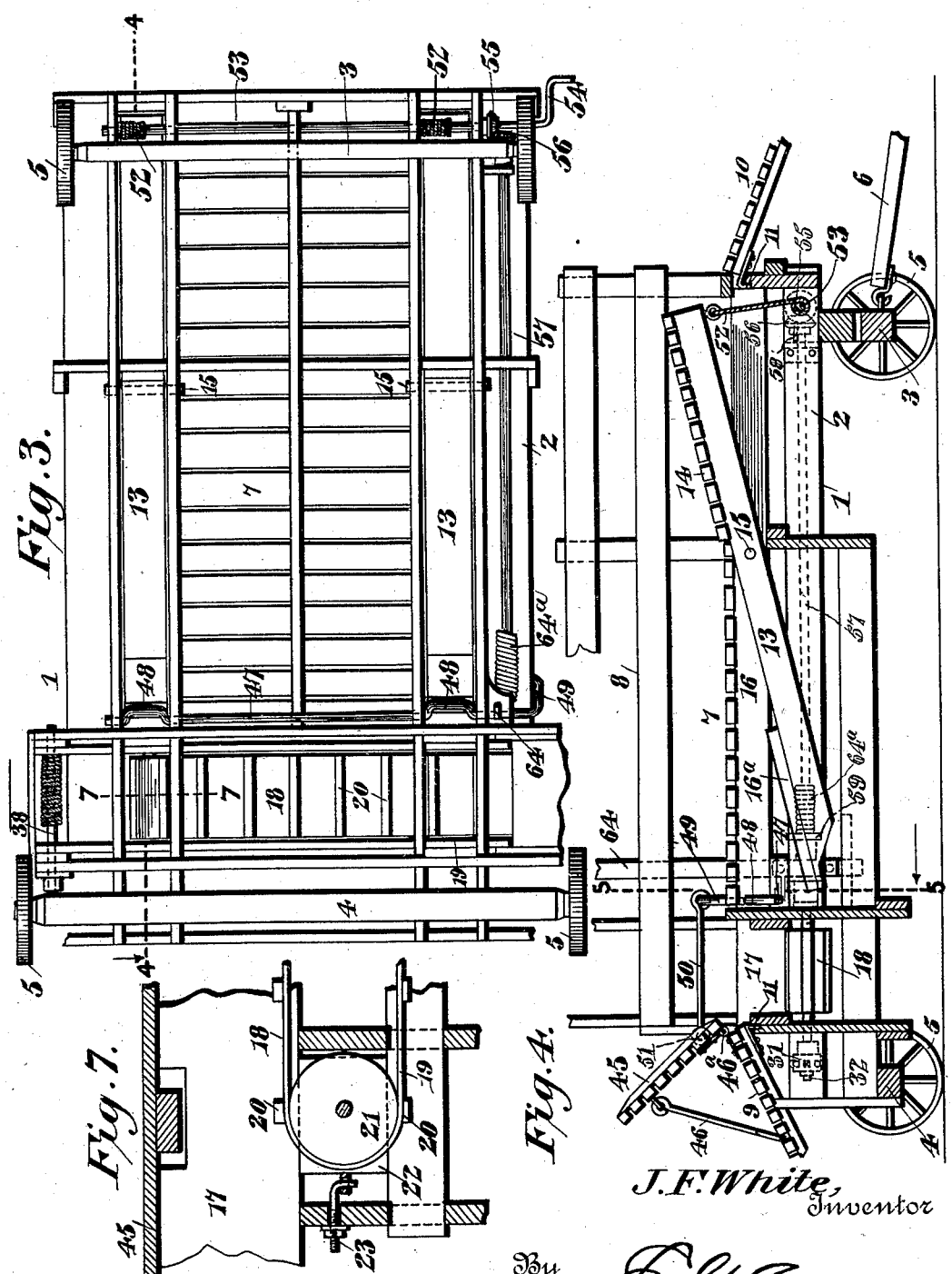

UNITED STATES PATENT OFFICE.

JOHN F. WHITE, OF BLOOMINGTON, ILLINOIS.

LOADING OR UNLOADING APPARATUS.

SPECIFICATION forming part of Letters Patent No. 671,122, dated April 2, 1901.

Application filed August 31, 1900. Serial No. 28,666. (No model.)

*To all whom it may concern:*

Be it known that I, JOHN F. WHITE, manufacturer, a citizen of the United States, residing at Bloomington, in the county of McLean and State of Illinois, have invented a new and useful Loading and Unloading Apparatus, of which the following is a specification.

This invention relates to loading and unloading apparatus, and has special reference to that type of apparatus usually employed for elevating grain from a wagon and depositing the same in a bin or granary.

To this end the invention contemplates a portable loading and unloading apparatus embodying certain novel features of construction rendering the same well adapted for handling all kinds of large and small grain, as well as potatoes, carrots, sugar-beets, and, in fact, almost anything heretofore handled with a scoop.

A further object of the invention is to provide such a construction and arrangement of parts as to specially adapt the apparatus for handling oats, wheat, and shelled corn without waste thereof.

The invention also has in view the equipment of the apparatus with improved means whereby all of the parts thereof are under the immediate control of the operator.

With these and other objects in view, which will more readily appear as the nature of the invention is better understood, the same consists in the novel construction, combination, and arrangement of parts hereinafter more fully described, illustrated, and claimed.

The improvements forming the subject-matter of the present application are necessarily susceptible to some modification without departing from the spirit or scope thereof; but the preferred embodiment of the improvements is shown in the accompanying drawings, in which—

Figure 8:
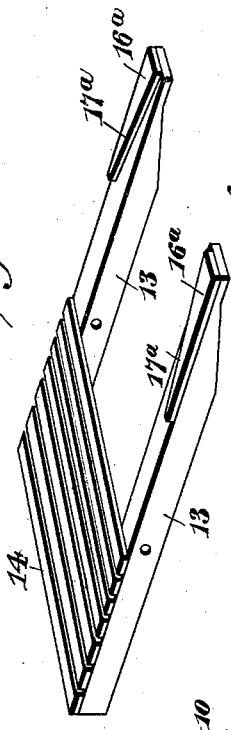
Figure 9:
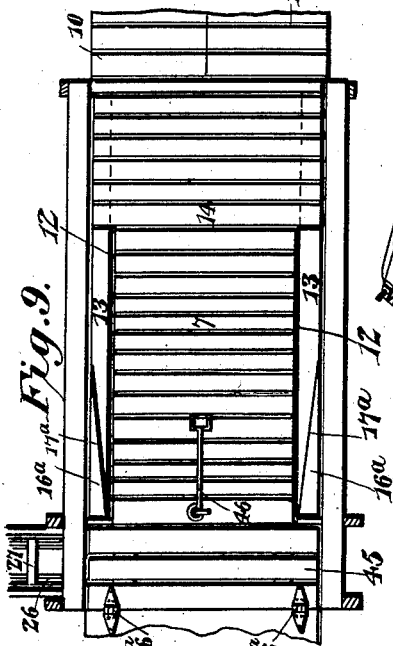
Figure 1:
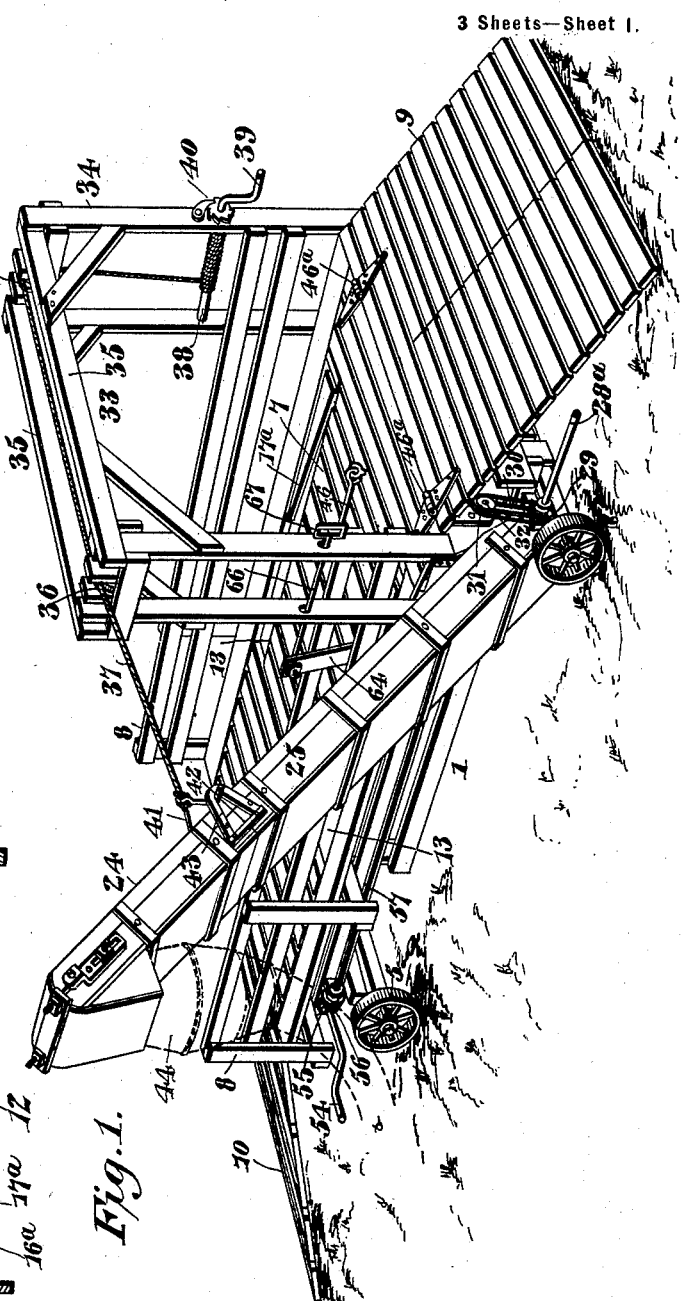

Figure 1 is a perspective view of a portable loading and unloading apparatus embodying the improvements contemplated by the present invention. Fig. 2 is a side view of a portion of the apparatus, showing more clearly the arrangement of the clutch-brake associated with the raising and lowering device for the tilting dump-rails. Fig. 3 is a bottom plan view of the apparatus. Fig. 4 is a vertical longitudinal sectional view on the line 4 4 of Fig. 3, showing the dump-rails tilted in the position which they assume to provide for tilting the wagon and dumping its contents. Fig. 5 is a cross-sectional view on the line 5 5 of Fig. 4, showing the relation of the lock-shaft to the dump-rails to provide for locking them in their normal horizontal position. Fig. 6 is an enlarged detail sectional view of the clutch-brake and showing the relation thereof to the conveyer within the receiving hopper or pit. Fig. 7 is a detail sectional view on the line 7 7 of Fig. 3, showing the tightener for the conveyer within the receiving hopper or pit. Fig. 8 is a detail in perspective of the connected tilting dump-rails. Fig. 9 is a detail plan view of the platform portion of the apparatus, showing in outline more plainly the relative positions of the tilting dump-rails and the door-covered receiving hopper or pit for the load.

Similar numerals of reference designate corresponding parts in the several figures of the drawings.

In carrying out the invention the entire apparatus, exclusive of the power for operating the same, is designed to be supported upon and carried by a portable truck 1. This truck 1 may be of any suitable design and essentially comprises a suitable base-frame 2, carrying the front and rear axles 3 and 4, respectively, upon the spindles of which axles are mounted the ground or supporting wheels 5, and there is designed to be coupled with the front axle of the truck an ordinary draft appliance 6, to which the team may be hitched when it is desired to move the apparatus from place to place.

The portable carrying-truck 1 has built thereon a wagon-platform 7, constructed of planking or in any other approved manner, said platform being designed to have driven thereon the loaded vehicle or wagon containing the harvest to be dumped and elevated to the bin or granary. The wagon-platform 7 is supported in an approximately horizontal position by the carrying-truck on which it is built and is provided at the opposite longitudinal sides thereof with the upright protective side railings 8, which act in the capacity of the usual guards for the team and wagon.

To provide the apparatus with a complete driveway for the team and wagon, there is associated with the main wagon-platform 7 the opposite inclined end tread-sections 9 and 10, which tread-sections are arranged, respectively, at the opposite ends of the platform and decline therefrom to the ground. Said end inclined tread-sections 9 and 10 are detachably connected at their upper ends by hooks or other suitable fastenings 11 to the truck-frame at the ends of the platform, so that when the apparatus is not in use the tread-sections may be readily disconnected or detached and placed within the truck upon the main wagon-platform, so as to facilitate the transportation of the apparatus as an entirety. The end tread-sections 9 and 10 are also preferably constructed of planking and respectively constitute an approach and descent for the wagon, the tread-section 9 serving to guide the team and loaded wagon onto the wagon-platform and the opposite tread-section 10 serving to carry the team and unloaded wagon off of the platform and onto the ground.

The horizontal wagon-platform 7 has formed therein the opposite parallel longitudinally-disposed rail-slots 12, in which are designed to register the parallel tilting dump-rails 13, consisting of beams of sufficient strength to support a loaded wagon and to carry the same to a dumping position or inclination. The said tilting dump-rails 13 in their normal position are designed to lie in horizontal planes flush with the upper surface of the wagon-platform 7, so as to constitute, in effect, a part of this platform, and in order to provide a wide platform-support for the loaded wagon the front end portions of the tilting dump-rails 13 are preferably connected by a platform-section 14, adapted to form one end portion of the main platform 7 when the rails are in their normal untilted positions.

The tilting dump-rails 13 are fulcrumed intermediate their ends upon the pivot pins or bolts 15, suitably fitted in the platform bed or framework beneath the same to provide strong pivotal supports for the said rails 13, whereby the same may be readily oscillated to provide for tilting the loaded wagon to a dumping position and also to assume horizontal positions flush with the platform, so that the wagon may be readily run onto and off of the same. In carrying out the present invention it is the purpose to provide the tilting dump-rails 13 with means whereby the wagon will automatically center itself upon the tilting support, consisting of the said rails 13 13, as said support tilts to a dumping position. The preferred expedient for accomplishing this result is to provide the rails 13 at their dropping ends opposite the platform-section 14 with triangular centering cleats or stops 16ª, projecting from the upper faces of the rails 13 and having their inclined edges 17ª extending obliquely across the said upper faces, so that as the rails are tilted, with the wagon thereon, the rear wheels of the wagon will roll against the inclined edges 17ª of the centering cleats or stops, thus causing the wagon to naturally shift itself to a central position upon the tilting support, and thereby obviate the dragging and pulling of the wagon to a central position, as is necessary in some types of loading and unloading apparatus heretofore patented.

The tilting support, consisting of the connected dump-rails 13, is designed to work in the vertical longitudinally-disposed rail-pockets 16, formed within the truck-frame beneath the plane of the rail-slots 12, said pockets 16 serving as housings for the dropping ends of the rails 13 and also acting in the capacity of guard-pockets to receive the rear wheels of the wagon as the latter tilts to a dumping position. This construction obviates the possibility of lateral shifting of the wagon from its position upon the tilting support during the dumping operation, and it is to be observed at this point that the tilting support, consisting of the dump-rails 13, is associated with a transversely-arranged load-receiving hopper or pit 17, (see Figs. 4 and 9,) which is built within the truck-frame at one end of the wagon-platform 7 and below the plane of the latter. The said load-receiving hopper or pit 17 extends transversely across the entire width of the truck and is open at the top, so as to receive therein the grain or other material as it discharges out of the end of the wagon, which end of the wagon is designed to project into or overhang the open upper side of the hopper or pit when the dump-rails are permitted to tilt to the inclined position shown in Fig. 4 of the drawings. The grain or other material which is discharged into the open upper side of the transversely-arranged receiving hopper or pit 17 falls upon a conveyer 18, located within the hopper or pit and extending longitudinally thereof from end to end. The said conveyer 18 is designed to move the load to one side of the apparatus, and may be of any approved type, but preferably consists of an endless conveyer-apron 19, provided with the usual flights 20 and arranged to pass over the oppositely-located apron-rollers 21. These apron-rollers 21 are respectively disposed at opposite ends of the receiving hopper or pit 17, and one of said rollers is preferably mounted in adjustable bearings 22, with which are connected an adjusting device 23 to provide for maintaining the apron 19 at the proper working tension; but it will of course be understood that any equivalent belt-tightening device might be substituted for this purpose. The grain or other material which is discharged into the hopper or pit 17 onto the conveyer 18, arranged longitudinally therein, is carried by said conveyer out to one side of the truck and is discharged into the lower end of an inclined elevator 24, projecting from one side of the truck and extending upwardly therefrom at an inclination to provide for elevating the grain or other material to the point of delivery, whether into a grain-car, a stationary bin, a granary, or other receptacle to receive the same. The said inclined elevator 24 essentially consists of a conveyer chute or trough 25 and a conveyer 26 working in said chute or trough throughout its entire length to provide for the elevation of the grain or other material, the said conveyer 26 preferably being of the endless apron or belt type and provided with the usual conveyer-flights 27, which afford a proper support for the material during its elevation. The chute or trough 25 for the inclined elevator carries at its lower inner end a conveyer-shaft 28, the extremities of which project from opposite sides of the chute or trough and pivotally and detachably engage in the open bearing-notches 29, (see Fig. 5,) formed in the ends of the frame-timbers at one side of the truck, thus providing a connection between the inclined elevator and the truck, which permits the said elevator to be raised or lowered on its pivot to change the inclination thereof, as well as admitting of the ready disconnection of the elevator from the truck-frame, so that it may be placed with the other removable parts upon the platform or otherwise disposed of when the apparatus is being transported. The said conveyer-shaft 28 at the lower inner end of the conveyer chute or trough 25 also constitutes the driving-shaft for both the transferring-conveyer 18 and the elevating-conveyer 26, said shaft 28 having an extension 28$^a$, designed to be connected with a horse-power or other suitable motor which may be employed for operating the apparatus. The said shaft 28 also has fitted on one of the extremities thereof a chain-wheel 29, over which passes a short driving-chain 30, which meshes with a chain-wheel 31 on one of the shaft extremities of the conveyer-shaft 32, carrying one of the apron-rollers for the transferring-conveyer 18 within the load-receiving hopper or pit 17. The gear connection described provides means whereby motion is directly transferred from the shaft of the elevating-conveyer to one of the shafts of the transferring-conveyer. The said inclined elevator 24, which is pivotally and detachably mounted at its lower end in the manner described, is designed to be raised and lowered through a suitable raising-and-lowering mechanism associated with a transversely-arranged overhead arched frame 33. The said overhead arched frame 33 spans the wagon-platform at the dumping end thereof and is of a sufficient height to permit of a team and wagon being readily driven thereunder. In other words, the said overhead arched frame 33 arises from the truck or platform in the vertical plane of the load-receiving hopper or pit 17 and essentially comprises the opposite vertical side portions 34 and the cross member 35, connecting the upper ends of the side portions 34 and lying parallel with the wagon-platform. The said upright arched frame 33 is provided at the upper opposite corners thereof with the guide-pulleys 36, over which is arranged to pass an adjusting-cable 37, one end of which cable winds and unwinds on a winding-shaft 38, journaled in suitable bearings in one of the upright side portions 34 of the frame. The said winding-shaft 38 is provided with a crank-handle 39 at one end and also with a pawl-and-ratchet check device 40, which serves to prevent the shaft 38 from turning when the inclined elevator 24 has been properly adjusted. The end of the adjusting-cable 37 opposite its connection with the shaft 38 is connected to a bail 41, having its terminals 42 engaging in the attaching-brackets 43, fitted to opposite sides of the conveyer chute or trough 25 at an intermediate point between the upper and lower ends of said chute or trough. By operating the shaft 38 the elevator 24 may be raised or lowered to any desired angle, and at this point it should be observed that the said elevator may be of any approved construction and may be employed with or without a swivel delivery-spout to provide for receiving the grain and other material from its upper end and carrying it into the grain-car or other receptacle therefor. An ordinary form of swivel-spout 44 is indicated in dotted lines in Fig. 1 of the drawings and is illustrative of a convenient manner of using the apparatus to provide for elevating grain and delivering it through the medium of the spout into the grain-car.

The open upper side of the load-receiving hopper or pit 17 is designed to be covered and uncovered by a trap-door 45, hinged at one edge, as at 46$^a$, to the adjacent portion of the platform and when closed being designed to lie flush with the main part of the platform to permit of a team and wagon driving thereover onto the tilting support. The trap-door 45 preferably has connected to the outer side thereof a pull-rod 46, which permits of the convenient opening of the same after the wagon has been properly positioned upon the dump-rails. In the present invention the opening movement of the trap-door is designed to be utilized to actuate and release the lock which holds the dump-rails in their normal horizontal positions. The said lock essentially consists of a transversely-arranged locking-shaft 47, journaled in suitable bearings beneath the wagon-platform and arranged transversely of the truck adjacent to the transverse load-receiving hopper or pit 17. The said transverse locking-shaft 47 is provided within the vertical rail and wheel receiving pockets 16 with the offset holding cranks or arms 48, adapted to engage beneath the dropping ends of the rails 13, as shown in Fig. 5 of the drawings, to provide for firmly sustaining the said rails in their horizontal positions and holding them in such positions when the wagon is driven thereon until it is ready to tilt the wagon and dump the load. The said locking-shaft 47 is provided at one end exterior to the truck-frame with a rock-arm 49, to which is pivotally connected one end of an operating-link 50, the other end of which link is pivotally connected with the trap-door 45 at the point 51, so that when the said door is thrown open the movement thereof is transmitted to the shaft 47, thus causing the said shaft to rock and swing the holding cranks or arms 48 thereof from beneath the dropping extremities of the rails 13, whereby the said rails are free to tilt with the wagon thereon.

The swinging up and down of the rails 13 is controlled through the rail-adjusting cables 52, attached at one end to the rails 13 at their connected ends and winding and unwinding at their other ends upon a windlass-shaft 53, journaled transversely of the truck-frame, at one end thereof, and which may be fitted exterior to the truck with an operating-crank 54. This crank, however, is not utilized under ordinary conditions, but simply for testing or exhibiting the apparatus when the same is not coupled with the horse-power or other motor for operating the same; yet in the event of any impairment of the power connection for driving the apparatus the said crank might be utilized. The said windlass-shaft 53 has fitted thereto a bevel or miter gear 55, adapted to mesh with a similar gear 56, feathered upon the inner end of the controlling-shaft 57. This controlling-shaft 57 is mounted in bearings 58 and 59 (see Fig. 2) at one side of the truck-frame, and the feathered connection with the bevel gear-wheel 56 permits the said shaft to have a slight longitudinal play independent of the gear 56, while at the same time turning in unison with such gear. At the end opposite the gear 56, carried thereby, the longitudinally-movable controlling-shaft 57 carries a cupped clutch-shoe 60, having an interior conical socket adapted to frictionally fit over or receive therein a friction-cone 61, carried upon one end of the conveyer-shaft 32 of the transferring-conveyer 18, said cupped shoe 60 and the cone 61 constituting not only a shaft-coupling for connecting the shafts 32 and 57, but also acting in the capacity of a friction-brake for controlling the tilting of the wagon and arresting precipitate movement thereof. The said shoe member 60 of the clutch is provided at one side with a ratchet-hub 62, coöperating with a ratchet-collar 63, rigid with and projecting at one side of one of the bearings 59 for the controlling-shaft 57, and a retractile spring 64ª, arranged upon the shaft 57 at one side of the bearing 59, serves to normally hold the ratchet or clutch members 62 63 in interlocking engagement. To provide for moving the shaft longitudinally and causing a disengagement of the ratchet members 62 63 and a registering engagement of the brake members 60 61, an adjusting-lever 64 is employed. This lever is pivotally supported at one side of the truck and carries a yoke 65, loosely embracing the ratchet-hub 62, and the upper end of the said lever has connected thereto an operating-rod 66, loosely mounted in one of the side portions 34 of the upright arched frame 33 and provided at one end with a handle 67.

With the parts of the apparatus in their normal positions the dump-rails 13 are locked by the locking-shaft 47 in the manner explained, the trap-door 45 is closed, and the spring 64ª holds the ratchet-hub 62 interlocked with the fixed ratchet member 63, so that the dump-rails are held perfectly rigid as a part of the platform and a team and wagon may be readily driven up the approach 9 and onto the main platform. After the wheels of the wagon have been positioned upon the tilting support, consisting of the rails 13 and the connecting platform-section 14, the trap-door 45 is swung open, thus causing the locking-shaft to be thrown out of operative relation to the dumping-rails and releasing the dropping ends thereof, after which time the operator draws upon the pull-rod 66, and thereby moves the controlling-shaft 57 longitudinally, which causes a disengagement of the ratchet members 62 and 63 and the engagement of the cupped brake-shoe 60 with the friction-cone 61 upon the revolving shaft 32 of the transferring-conveyer 18. The pressure upon the operating-rod will determine the pressure of the shoe 60 upon the cone 61, thus providing an effective brake for allowing the loaded wagon to tilt the dump-rails at any desired speed. The operator is accordingly in complete control of the dumping movement and can positively prevent precipitate tilting of the loaded wagon, and at this point it will be observed that the operator may conveniently stand upon the approach 9 in proximity to the controlling-rod 66, so as to have the entire apparatus under complete and ready control without the necessity of moving off of the platform 9. In this location the same operator can readily remove and replace the tail or end gate of the wagon.

It has already been explained that during the tilting movement of the dump-rails 13, which are carried downward by the weight of the wagon on account of the eccentric pivoting of said rails, the operator draws upon the pull-rod 66 sufficiently to frictionally engage the shoe 60 with the friction-cone 61, thus causing the controlling device to act in the capacity of a friction-brake while dumping the load; but when the load has been emptied into the hopper or pit 17 and onto the transferrer 18 a stronger pull upon the rod 66 causes the shoe 60 to become locked upon the cone 61, and thus provide an effective shaft-coupling for operatively connecting together the shafts 32 and 57, thereby causing a rotation of the said shaft 57 in a direction which provides for winding up the cables 52 thereon and drawing the rails back to the normal horizontal position. Hence the same controlling device acts in the capacity of a friction-brake for the tilting movement of the rails and also as a shaft-coupling to provide for the automatic drawing back of the rails to their normal position, the same movement on the part of the operator serving to secure these two results.

From the foregoing it is thought that the construction, operation, and many advantages of the herein-described apparatus will be readily apparent to those skilled in the art without further description, and it will be understood that various changes in the form, proportion, and minor details of construction may be resorted to without departing from the principle or sacrificing any of the advantages of the invention.

Having thus described the invention, what is claimed as new, and desired to be secured by Letters Patent, is—

1. In a loading and unloading apparatus, a truck having a platform, a load-receiving hopper at one end of the platform, a transferring-conveyer within the hopper, a tilting support associated with the platform and essentially comprising tilting dump-rails, a locking device for the dump-rails consisting of a transversely-arranged locking-shaft having opposite holding cranks or arms adapted to engage beneath the dropping ends of the rails, said shaft being also provided with a rock-arm, a trap-door arranged to cover and uncover said hopper, and an operating-link connecting the trap-door with said rock-arm, substantially as set forth.

2. In a loading and unloading apparatus, a truck having a platform provided with longitudinally-disposed rail-slots, a tilting support consisting of a pair of dump-rails working in said slots, and a platform-section connecting the rails at one side of their pivots and forming a continuation of the platform, the ends of the rails opposite the platform-section being provided with stops for the wagon, and locking means for normally sustaining the tilting support in flush relation with the platform, substantially as set forth.

3. In a loading and unloading apparatus, the combination with the platform, of a pair of tilting dump-rails, provided at their dropping ends with centering-stops for the wagon, substantially as set forth.

4. In an apparatus of the class described, the combination with the platform, of the tilting rails provided at their dropping ends with approximately triangular centering stops or cleats having their inclined edges extending obliquely across the upper faces of the rails, substantially as set forth.

5. In a loading and unloading apparatus, the truck having a platform and a transversely-arranged load-receiving hopper at one end of the platform, a transferring-conveyer working within the hopper, an inclined elevator arranged at one side of the truck and coöperating with said conveyer, a tilting support for the wagon coöperating with the platform, and essentially comprising a pair of connected dump-rails, a locking device coöperating with the dropping end of the tilting support, a trap-door for the hopper having an operative connection with said locking device, an adjusting mechanism connected with the end of the tilting support opposite the locking device, and a brake associated with said adjusting mechanism, substantially as set forth.

6. In a loading and unloading apparatus, the combination with the platform and the tilting wagon-support, of an adjusting mechanism having operative connection with one end of said support, and a brake device associated with said adjusting mechanism to control the dropping movement thereof, substantially as specified.

7. In a loading and unloading apparatus, the combination with the platform and the tilting wagon-support, of the adjusting mechanism for the support including a windlass-shaft and cables winding and unwinding on the shaft and connected with the support, and a normally inactive brake device operatively connected with the windlass-shaft and independently controllable.

8. In a loading and unloading apparatus, the combination with the platform, and the tilting support for the wagon, of an adjusting mechanism comprising a windlass-shaft and rail-adjusting cables connected with said shaft and said tilting support, and a clutch-brake comprising complementary members upon separate shafts, one of which is operatively geared with the windlass-shaft of the adjusting mechanism, substantially as set forth.

9. In an apparatus of the class described, the combination with the platform and the tilting wagon-support, of an adjusting mechanism for the tilting support, and a brake device comprising a controlling-shaft having one brake member and operatively connected with the adjusting mechanism for the tilting support, and the shaft of one of the moving members of the apparatus having the other or complementary brake member, substantially as set forth.

10. In a machine of the class described, the combination with the machine-platform and the tilting support, of the adjusting mechanism comprising a windlass-shaft and cables connected with said shaft and with the tilting support, a transferring-conveyer for the load having a shaft provided with a friction element, and a controlling-shaft operatively geared with said windlass-shaft and also having a friction element coöperating with the element carried by the shaft of the transferring-conveyer, substantially as set forth.

11. In a machine of the class described, the combination with the platform and the tilting wagon-support, of an adjusting mechanism comprising a windlass-shaft, and cables connected with said shaft and said support, a conveyer for the material having a shaft provided with a friction-cone, a longitudinally-movable spring-retracted controlling-shaft operatively geared with said windlass-shaft and provided with a cupped friction-shoe, coöperating with said friction-cone and with a ratchet-hub arranged at one side of the said shoe, a fixed ratchet element normally engaged by said ratchet-hub carried by the controlling-shaft, and an adjusting-lever operatively related to said longitudinally-movable controlling-shaft.

12. In a loading and unloading apparatus, the combination with the platform and the tilting wagon-support, of adjusting mechanism for the wagon-support, and a combined brake and shaft-coupling associated with said adjusting mechanism and comprising means for actuating the same and also for braking the tilting movement of the support.

13. In a loading and unloading apparatus, the combination with the platform and the tilting wagon-support, of a combined brake and shaft-coupling associated with said support and comprising means for braking the tilting movement thereof, and also for swinging the same back to normal position, and a single controlling device for said mechanism.

14. In a loading and unloading apparatus, the combination with the platform and the tilting wagon-support, of adjusting mechanism having operative connection with said support, a clutch-brake associated with said mechanism, and an operating connection with said clutch-brake for causing the same to operate as a brake and as a shaft-coupling.

In testimony that I claim the foregoing as my own I have hereto affixed my signature in the presence of two witnesses.

JOHN F. WHITE.

Witnesses:
　PEARL REED,
　J. B. SPALDING.